Jan. 2, 1940.　　　F. J. YOUNG　　　2,185,822
ROTARY SWIVEL
Filed Nov. 6, 1937　　　2 Sheets-Sheet 2

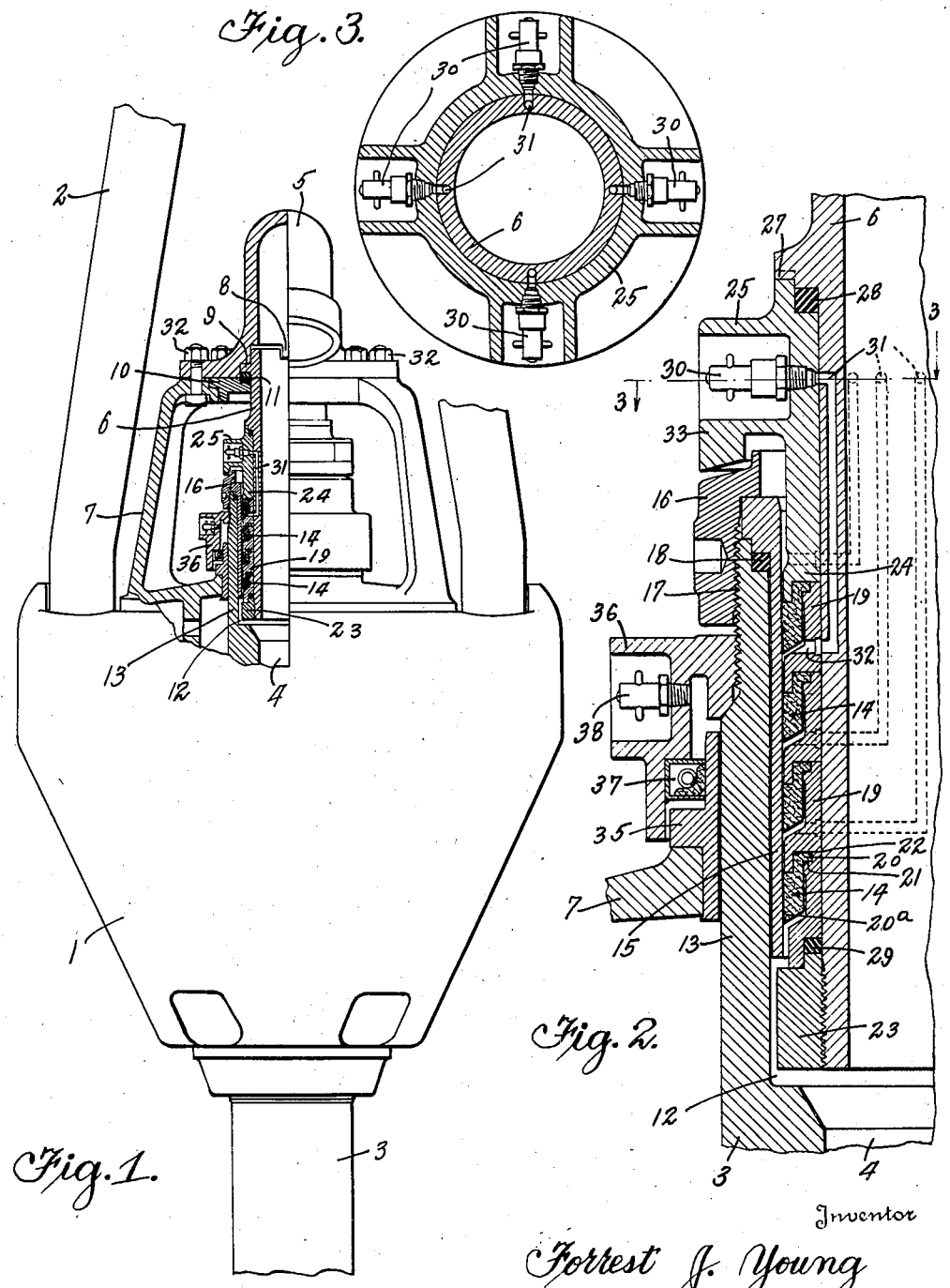

Inventor
Forrest J. Young
By Lyon & Lyon
Attorneys

Patented Jan. 2, 1940

2,185,822

UNITED STATES PATENT OFFICE 2,185,822

ROTARY SWIVEL

Forrest J. Young, Los Angeles, Calif., assignor to The National Supply Company, Torrance, Calif., a corporation of Pennsylvania Application November 6, 1937, Serial No. 173,178

6 Claims. (Cl. 285—97.9)

This invention relates to rotary hydraulic swivels of the type employed in the drilling of oil and gas, water wells, or in other drilling operations, and is more particularly directed to an improvement in the connection provided between the stationary and rotating elements of such a swivel to provide a fluid-tight connection between such elements.

An object of this invention is to provide a rotary hydraulic swivel in which there is formed a rotary fluid-tight connection between a stationary and rotating element of such swivel which includes a replaceable wear member providing the only wearing surface presented to the packing elements in such connection.

Another object of this invention is to provide a rotary hydraulic swivel which includes a plurality of resilient packing cups fixed in spaced relationship upon the stationary fluid conducting member in position to contact a hardened liner secured to the rotary stem.

Another object of this invention is to provide a packing assembly for two relatively rotatable members in which spaced packing cups are fixed to one member and forming a rotary seal with the other member and wherein means are provided to lubricate the contact surface of each of said packing cups.

Another object of this invention is to provide a rotary fluid-tight connection in which all wearing elements may be removed as a unit.

Another object of this invention is to provide a rotary fluid-tight connection which includes a replaceable wearing surface member which is secured in position by means of a threaded member, which threaded member is likewise so assembled with relation to the wearing member as to enable the same to be utilized to force the wearing member out of position.

Other objects and advantages of this invention it is believed will be apparent from the following detailed description of a preferred embodiment thereof as illustrated in the accompanying drawings.

In the drawings:

Figure 1 is a side elevation of a hydraulic rotary swivel embodying my invention illustrating the same as partly in section to indicate the rotary fluid-tight connection thereof.

Figure 2 is a sectional fragmental enlarged view of the rotary fluid-tight connection illustrated in my invention illustrating diagrammatically therein the manner of lubrication of the packing cups or elements of such assembly.

Figure 3 is an end sectional view taken substantially on the line 3—3 of Figure 2 illustrating the lubricating means in actual position in such structure.

Figure 4:
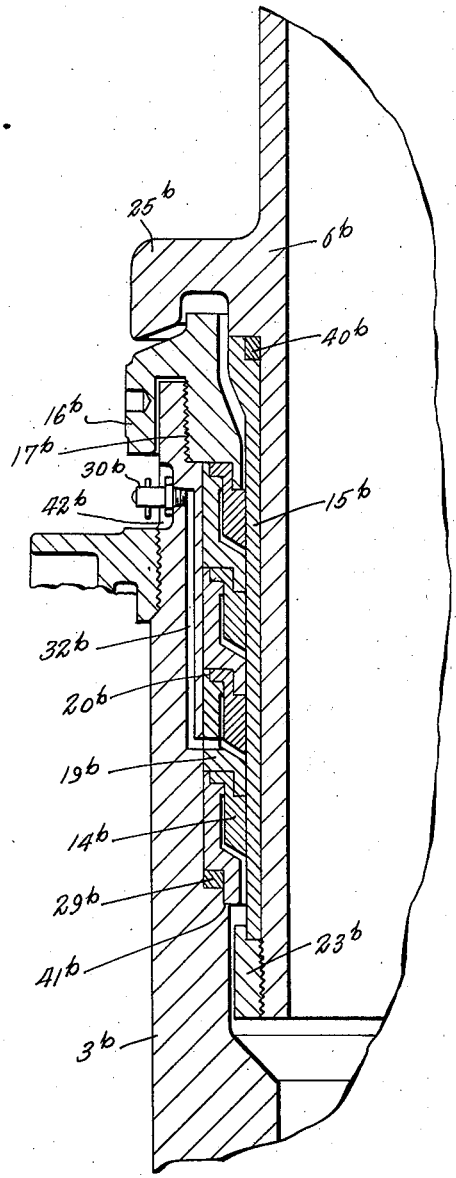
Figure 4 is a fragmental sectional elevation similar to that illustrated in Figure 2 of a modified form of fluid-tight connection embodying my invention.

The hydraulic rotary swivel as illustrated includes a body 1 which is supported by a bail 2. A rotary stem 3 is rotatably supported within the body 1 in any suitable or desirable manner as is well understood in the art. The rotary stem 3 has an axial fluid passage 4 which communicates at its lower end with the drill string (not shown) and at its upper end through a fluid connecting member 6 with a goose-neck 5. The fluid connecting member 6 is supported by a support 7 mounted upon the body 1. The fluid connecting member 6 is keyed at 8 to the gooseneck 5 to prevent relative rotation. The member 6 is supported upon an annular flange 9 which is clamped between the goose-neck 5 and a split adapter plate 10. Packing 11 is positioned between the groose-neck 5 and the member 6 to form a fluid-tight connection therebetween.

At its upper end the rotary stem 3 is provided with a large diameter bore which forms the outer boundary of an annular packing recess 12.

Within the packing recess 12 is mounted a plurality of packing cups 14. As illustrated in Figure 2, the packing cups 14 are mounted upon member 6 to bear against the inner hardened surface of a replaceable sleeve 15. The replaceable sleeve 15 is supported upon the upper end of the stem 3 and is held in position thereon by means of a cap member 16. The cap member 16 is threaded at threads 17 to the stem 3.

In order to form a fluid-tight connection between the sleeve 15 and the stem 3, packing 18 is provided.

The cups 14 are mounted on the member 6 in spaced relation and are held in spaced relation by means of spacing collars 19. Each of the cups 14 is provided with an annular lip 20ª which engages the inner surface of the sleeve 15 and a flange 20 which serves to hold the cups 14 in fixed position. Each of the spacers 19 is provided near its upper edge with an annular ledge 21 adapted to receive the cup flange 20. Each of the flanges 20 is clamped between the adjacent spacers 19 to give a predetermined initial compression prior to the opposing ends 22 meeting. The depth of the ledge 21 is so proportioned to the thickness of the flanges 20 so that the resilient material of which the packing cups 14 are formed is not overstressed. This method of mounting the cups 14 produces an independent mounting for each of such packing cups.

The packing cups and spacers are held in position by means of a nut 23 which is threaded to the lower end of the member 6. The uppermost spacer abuts the tubular end 24 of the cap member 25. The cap member 25 is mounted upon the member 6 and is held against rotation by means of a lug 27 which fits into a corresponding recess formed in the cap 25. Packing 28 is interposed between the cap member 25 and the member 6 to form a fluid-tight connection at this point. A packing ring 29 is interposed between the nut 23 and the lower spacer 19 to form a fluid-tight connection at this point of the construction.

Lubricant is applied to each of the packing cups 14 through fittings 30 mounted within the cap 25. In order that each of the packing cups 14 may be independently lubricated, a separate fitting 30 is provided for each of such cups. Lubricant forced through the fittings 30 passes through a passage 31 formed in the member 6 downwardly and outwardly through passages 32 formed in the spacers 19 to the packing cups 14. In Figure 2 it will be noted that these passages 31 are indicated in dotted lines, one of said passages being indicated for supplying lubricant to each of such packing cups 14. It will be obvious from an inspection of Figures 2 and 3 that the locations of these passages does not correspond. The position for the passages as illustrated in Figure 3 is the position which such passages actually assume in the construction. In Figure 2 these passages have been diagrammatically illustrated out of position in order to more clearly illustrate the manner of independent lubrication of each of the packing cups 14. The passages 31 are so positioned with reference to each of said cups that the lubricant applied is directed downwardly past the lips 20$^a$ in a direction counter to that of the applied fluid pressure. It will thus be obvious that the surface between each lip 20$^a$ and the liner or sleeve 15 may be kept well lubricated and that the introduction of lubricant behind each cup 14 acts to cleanse the contacting surfaces of accumulated foreign matter.

In removing the packing assembly as a unit from the swivel, the goose-neck 5 is first removed by removing its positioning bolts 32. It will be observed that the apron 33 of the collar 25 extends outwardly over the nut 16. By unscrewing nut 16 from the stem 3, the nut 16 engages the cap 25, forcing the same upwardly, and thereby lifting from the assembly the entire packing element including the liner sleeve 15.

In this operation the upper edge of the nut 23 engages the lower edge of the sleeve 15. The threads 17 are thus used by the rotation of the nut 16 for the purpose of jacking the packing assembly out of the swivel.

Packing means are provided between the stationary support 7 and the stem 3, which packing means and construction, however, forms no part of the present invention but is of the construction as specifically illustrated and claimed in the patent to Murphy, No. 2,080,225, issued May 11, 1937. This construction includes briefly a sleeve extension 35 which is pressed into the support 7 and a bonnet 36 which is threaded to the stem 3 and overhangs the sleeve extension 35. Sealing means 37 is carried by the bonnet 36 within an annular recess formed between the bonnet 36 and sleeve 35. A pressure fitting 38 is used to supply lubricant to the sealing means 37.

It will be obvious from the foregoing that the particular manner of mounting of the packing cups 14 as to whether the same are positioned upon the stationary member 6 or are carried by the rotating stem 3 is a matter of design and selection and I have illustrated in Figure 4 a modification of my invention wherein the particular location and support of the cups 14 has been reversed from that as shown in Figure 2.

In the modification of my invention as illustrated in Figure 4, similar parts are indicated with similar numerals with the addition of an exponent "b" added thereto.

In this modification of my invention the liner sleeve 15$^b$ is mounted upon the stationary member 6$^b$ and is sealed by means of packing 40$^b$ carried by the cap 25$^b$. The liner is held in position upon the member 6$^b$ by means of a nut 23$^b$. The packing cups 14$^b$ are mounted with relation to the spacers 19$^b$ upon the stem 3$^b$ within the packing chamber formed by increasing the internal diameter of the stem 3$^b$ near its upper end. The lowermost spacer 19$^b$ engages a shoulder 41$^b$ within this packing chamber and rests upon the stationary packing 29$^b$.

The cap nut 16$^b$ is in this modification of my invention internally threaded on the thread 17$^b$ within the upper end of the stem 3$^b$ in such a manner as to maintain the initial compression required upon the flanges 20$^b$ of the packing cups 14$^b$.

Lubrication is provided for each of the packing cups in substantially the same manner as shown in connection with the first modification of my invention in that pressure fittings 30$^b$ are mounted within recesses 42$^b$ formed in the stem 3$^b$ in position to feed lubricant through conduits 32$^b$ formed in the upper end of the stem 3$^b$ and terminating with relation to the packing cups 14$^b$ in substantially the same manner as set forth in connection with the packing cups 14.

In this modification, as in the previous modification, the packing assembly, including the stationary member 6$^b$, the liner 15$^b$, cups 14$^b$, and spacers 19$^b$, are removed as a unit assembly by unscrewing the member 16$^b$ relative to the stem 3$^b$ with the result that the member 16$^b$ engages the cap 25$^b$ forcing the stationary member 6$^b$ upwardly so that the nut 23$^b$ engages the lower spacer 19$^b$, thereby stripping the entire packing assembly from within the packing chamber formed in the upper end of the stem 3$^b$. In this modification of my invention, however, the nut member 16$^b$ forms the dual purpose of a jack nut and an initial compression nut for maintaining the required initial compression upon the flanges 20$^b$ of the packing cups 14$^b$.

Having fully described my invention, it is to be understood that I do not wish to be limited to the details herein set forth, but my invention is of the full scope of the appended claims.

I claim:

1. In a hydraulic rotary swivel, the combination of, a rotary member, a stationary member, one of the members encircling the other and defining between them an annular recess for packing, a fluid passageway extending axially of the rotary member, a passageway in the stationary member forming a continuation of said fluid passageway, packing means in said annular recess adapted to prevent fluid leakage at the junction of said passageways, said packing means including a plurality of annular resilient packing elements, individual means on said stationary member adapted to secure each packing element to said member independently of the other packing elements, said elements each contacting the rotary member to form a rotary seal.

2. In a hydraulic rotary swivel, a rotary member, a stationary member, one of the members encircling the other and defining between them an annular recess for packing, a fluid passageway extending axially of the rotary member, a passageway in the stationary member forming a continuation of said fluid passageway, packing means in said annular recess adapted to prevent fluid leakage at the junction of said passageways, said packing means including a plurality of annular resilient packing cups each having an annular flange, said cups being positioned axially of said rotary member and adapted to contact one of said members to form a rotary seal, means to secure said cups on the other of said members in axially spaced relationship, said means including non-resilient spacers adapted to clamp each flange between adjacent spacers, there being an abutment operatively associated with each spacer to limit the initial compression of said flanges.

3. In a hydraulic rotary swivel, the combination of a rotary member, a stationary member, one of the members encircling the other and defining between them an annular recess for packing, a plurality of annular resilient packing elements within said recess, each element having an annular flange, means mounted on one of said members adapted to secure each packing element to said member in axially spaced relationship, said means including a plurality of non-resilient spacers adapted to clamp each flange between adjacent spacers, an abutment on each spacer adapted to directly contact the adjacent spacer to limit the initial compression of said flanges, and a skirt on each spacer adapted to overlap the abutment on the adjacent spacer in telescopic relation.

4. In a rotary swivel for use in drilling wells including a body structure, a stem having a passage therethrough rotatably supported by said body structure, and a stationary conduit connected to deliver rotary mud to the passage in the stem, said conduit and said stem passage providing a rotary mud passageway through which rotary mud is passed under pressure, the combination including: a rotatable wall on said stem and a non-rotatable wall on said conduit cooperating to form an annular packing chamber having a closed posterior end and an open anterior end in communication with said rotary mud passageway, packing means in said annular packing chamber including a plurality of annular resilient packing elements, said packing elements being axially spaced along one of said walls and individually secured with respect thereto, a liner removably secured upon the other of said walls, said packing elements each having a lip portion adapted to contact said liner to prevent flow of rotary mud from the anterior end toward the posterior end of said annular packing chamber.

5. In a hydraulic rotary swivel, having a stationary member, a rotary member encircling a portion of the stationary member and defining between them an annular recess for packing, the combination of a packing assembly within said recess including a first portion comprising a liner and a second portion comprising a series of annular resilient packing elements having non-resilient spacers interposed therebetween, a nut threaded upon said rotary member and adapted to secure one of said portions of said packing assembly in operative position, the other portion of said packing assembly being secured in operative position on said stationary member, a pair of axially spaced abutments on the stationary member, one overhanging said nut and the other extending below the portion of the packing assembly on the rotary member, whereby the nut, upon being unthreaded from said rotary member cooperates with the upper abutment to move the stationary member and the packing assembly upwardly from said recess as a unit.

6. In a packing assembly for an annular recess between two relatively rotatable members, the combination of, an annular resilient packing element having a sealing portion adapted to be expanded into sealing engagement with the wall of the first member, and having an anchored portion above the sealing portion adapted to be secured to the second member, said element being formed on its periphery intermediately of said aforesaid portions to define an upwardly facing annular shoulder, means on said second member including a non-resilient annular skirt adapted to engage said shoulder, and passage means associated with said second member and positioned above said skirt whereby lubricant may be conveyed downwardly between said skirt and said first member to lubricate the sealing portion of said packing element.

FORREST J. YOUNG.